United States Patent Office 3,444,158
Patented May 13, 1969

3,444,158
METHOD FOR THE PRODUCTION OF
NUCLEOTIDES
Mikio Honjo and Kin-Ichi Imai, Takatsuki, and Yoshiyasu Furukawa, Suita, Japan, assignors to Takeda Chemical Industries, Ltd., Osaka, Japan
No Drawing. Filed Oct. 4, 1966, Ser. No. 584,092
Claims priority, application Japan, Oct. 4, 1965, 40/60,945
Int. Cl. C07d 51/50
U.S. Cl. 260—211.5                 7 Claims

ABSTRACT OF THE DISCLOSURE

Nucleotide is produced by reacting the nucleoside selected from the group consisting of 1-β-D-arabinofuranosylcytosine, 9-β-D-glucopyranosyladenine, 2'-O-methyluridine, 2'-O-methylcytidine, 9-β-D-xylofuranosyladenine, 2'-deoxycytidine, 2'-deoxyadenosine, 2'-deoxyuridine and thymidine with phosphorylating agent in the presence of a member selected from the group consisting of phenols, nitriles, organic carboxylic acid esters and nitro-hydrocarbons.

---

This invention is concerned with a method for the production of nucleotide, which comprises reacting nucleoside selected from the group consisting of 1-β-arabinofuranosylcytosine, 9-β-D-glucopyransoyl-adenine, 2'-O-methyluridine, 2'-O-methylcytidine, 9-β-D-xylofuranosyl-adenine, 2'-deoxycytidine, 2'-deoxyadenosine, 2'-deoxyuridine and thymidine with a specific phosphorylating agent in the presence of phenol, nitrile, organic acid ester or nitro compounds, followed by subjecting the resultant compounds to hydrolysis.

Specific nucleotides derived by phosphorylation of such specific nucleosides as 1-β-D-arabinofuranosylcytosine, 9-β - D - glycopyranosyladenine, 2'-O-methyluridine, 2'-O-methylcytidine, 9-β-D-xylofuranosyladenine, 2'-deoxycytidine and 2'-deoxyadenosine, are known to be useful for biochemical or biological reagents or for condiments in the production of various foods.

The nucleosides corresponding to the above-mentioned nucleotides have one or more OH groups other than primary OH group of the hexose or pentose moiety as well as primary OH group of the hexose or pentose moiety and, therefore, on preparing these nucleotides from the corresponding nucleosides, it has been considered to be necessary to protect the non-primary OH groups prior to subjecting the nucleosides to the phosphorylation reaction, and to remove the protecting groups after completion of the phosphorylation reaction.

According to the present invention, the above-mentioned specific nucleotides can be obtained in a high yield by simple procedure without requiring protection of OH groups other than primary OH group of the pentose or hexose moiety prior to effecting phosphorylation of the corresponding nucleoside with a specific phosphorylating agent in the presence of a specific organic compound.

It is an object of the present invention to provide a novel and industrially feasible method for the production of specific nucleotide from the corresponding nucleoside.

It is also an object of the present invention to prepare nucleotide from nucleoside by means of phosphorylation at the primary OH group in a specific pentose or hexose moiety of nucleoside in a good yield by simple procedure and without the necessity of protecting any other OH groups in the pentose or hexose moiety of nucleoside.

These objects are realized by the present invention on the basis of the unexpected finding that only the primary OH group in the specific pentose or hexose moiety of the nucleoside is selectively phosphorylated without requiring protection of the other OH groups in the pentose or hexose moiety of the said nucleoside by reacting the nucleoside with a phosphorylating agent in the presence of a specific organic compound, followed by subjecting the resultant product to hydrolysis.

The present method for the production of nucleotide is a preferable one from an industrial point of view, since it does not involve such troublesome procedure as protecting non-primary OH groups and removal of the protected groups, but easily affords the desired nucleotide in a good yield.

As stated above, the present invention comprises reacting nucleoside selected from the group consisting of 1-β-D-arabinofuranosylcytosine, 9 - β-D-glucopyranosyladenine, 2'-O-methyluridine, 2'-O-methylcytidine, 9-β-D-xylofuranosyladenine, 2'-deoxycytidine, 2'-deoxyadenosine, 2'-deoxyuridine and thymidine with a phosphorylating agent in the presence of an organic compound such as phenol, nitrile, organic acid ester or nitro compound.

The specific "nucleoside" in the present invention may be prepared by a per se known process, for example, by reacting under heating, a silver salt, a mercurous chloride salt or a mercuric chloride salt of a purine base (e.g. adenine, etc.), or a pyrimidine base (e.g. cytosine, thymine, etc.) with the corresponding saccharide, whose free —OH groups are acylated.

The nucleoside may also be prepared by extraction, in per se conventional manner, of naturally occurring sources containing them.

The nucleoside can be used in the free form or in various forms of salts which may be desired.

Among the organic compounds, phenols and nitriles are best suited for practical use.

The phenols used in the present invention can be exemplified by monophenols such as phenol, naphthol, o-chlorophenol, 2,6-dichlorophenol, 2,3,6-trimethylphenol, thymol, cresol (o-, m- and p-cresol or a mixture thereof), xylenols, and polyphenols such as catechol, resorcinol, phloroglucinol, etc.

Among the phenols, monophenols give best results, and especially, phenol, o-chlorophenol, cresol (o-, m-, p-creson or a mixture thereof) and xylenol are desirably employed.

The nitrile compounds used in the present invention are those having 2 to 8 carbon atoms and are exemplified by aliphatic mononitrile such as acrylonitrile, acetonitrile, propionitrile, butyronitrile, aliphatic dinitriles such as malononitrile, succinonitrile, and aromatic nitriles such as benzonitrile, benzyl cyanide (phenylacetonitrile), tolunitrile, etc.

Among the nitrile compounds, acrylonitrile, benzylcyanide, acetonitrile, malononitrile and benzonitrile are preferable, and especially acetonitrile, malononitrile and benzonitrile give best results.

The organic acid esters used in the present invention are esters of organic carboxylic acids having 2 to 7 carbon atoms such as aliphatic organic acid (e.g. acetic acid, propionic acid, acrylic acid, oxalic acid, etc.), aromatic organic acids (e.g. benzoic acid, etc.).

As the esters, lower aliphatic esters (e.g. methyl-, ethyl-, propyl-, butyl-esters, etc.) of the said organic carboxylic acids are best, but if desired higher aliphatic esters (e.g. lauryl ester, palmityl ester, etc.) or aromatic esters (e.g. phenyl ester, etc.) may be used.

Among the organic acid esters, esters of carboxylic acid, especially methyl acrylate and ethyl benzoate give best results.

The nitro compounds used in the present invention are nitro-hydrocarbons having 1 to 7 carbon atoms and exemplified by aliphatic mononitro compounds such as nitromethane, nitroethane, aliphatic polynitro compounds such as tetranitromethane, 1,3-dinitropropane, and aromatic nitro compounds such as nitrobenzene, di-nitrobenzene, m-nitrotoluene, etc.

Among the nitro compounds, aliphatic or aromatic mononitro compounds are best, and especially nitromethane and nitrobenzene give optimal results.

The phosphorylating agents in the present method include, for example, phosphorus trichloride, phosphorus oxychloride, phosphorus pentachloride, pyrophosphoryl tetrachloride, or such partially hydrolyzed phosphorus compounds as partially hydrolyzed phosphorus oxychloride, partially hydroylzed phosphorus pentachloride or partially hydrolyzed phosphorus trichloride which are prepared by mixing water and corresponding phosphorus compounds.

Among these phosphorylating agents, pyrophosphoryl tetrachloride, phosphorus oxychloride and partially hydrolyzed phosphorus oxychloride give best results.

The above mentioned nucleosides, organic compounds or phosphorylating agents need not be in a pure state. The amount of the organic compounds and the phosphorylating agents used vary with the kind of nucleosides, the organic compounds and phosphorylating agents. Generally, the amount of phosphorylating agents is from about 2 to about 10 moles relative to the above mentioned nucleoside.

The organic compound is employed in an amount ranging from about 40 to about 300 moles per mole of the nucleoside.

The reaction proceeds easily at not higher than room temperature (25° to 30° C.) for about 1 to 4 hours, but if desired may be carried out with heating or cooling.

When the organic compound used is liquid, no other reaction solvent is required.

On the other hand, in case of using a solid compound, a suitable solvent such as benzene, xylene and toluene is used together with the compound.

In this way, only the primary hydroxy group in pentose or hexose moiety of nucleoside is selectively phosphorylated.

The thus-obtained product is then subjected to hydrolysis to give the objective nucleotide.

The hydrolysis is carried out by per se known procedure, for example, by pouring the reaction mixture into water, preferably cooled water, or ether, or by adjusting the pH value of the reaction mixture obtained in the first step to the weakly acid area, desirably to about pH 1 to 2, by adding an alkaline material (e.g. sodium hydroxide, potassium hydroxide, sodium carbonate, potassium carbonate, etc.).

As detailed above, by the present invention the specific nucleotide can easily be obtained in a short period of time and in a good yield by a simple process.

The nucleotide may be obtained in the free form or as its salt, such as barium salt, sodium salt, potassium salt or ammonium salt. When the nucleotide obtained is of the free type, it may be changed into a desired salt in per se conventional manner, and in case the nucleotide is obtained in salt form, it may also be changed into free form upon necessity.

Thus, such nucleotides as cytosinearabinoside-5′-monophosphate, adenineglucoside - 6′ - monophosphate, 2′-O-methyluridine - 5′-monophosphate, 2′-O-methylcytidine-5′ - monophosphate, 9β - D - xylofuranosyl - adenine-5′-monophosphate, 2′ - deoxyadenosine - 5′-monophosphate, 2′-deoxycytidine - 5′ - monophosphate, 2′ - deoxyuridine-5′-monophosphate and thymidine-5′-monophosphate or salts thereof, such as barium salt, sodium salt, potassium salt or ammonium salt are prepared in a good yield.

For the purpose of giving those skilled in the art a better understanding of the invention, the following examples of presently preferred embodiments are given. Parts by weight bear the same relation to parts by volume as do grams to milliliters.

EXAMPLE 1

To 0.906 part by weight of -β-D-arabinofuranosylcytosine suspended in 37 parts by volume of m-cresol was added 1.3 parts by volume of pyrophosphoryl tetrachloride at a temperature of 0 to 5° C.

The mixture was stirred under the same temperature for 3 hours. The reaction mixture was poured into 150 parts by volume of ice water and the whole mixture was subjected to extraction with 150 parts by volume of ether to transfer the m-cresol into the ether layer.

After the aqueous layer was separated and adjusted to pH 2 with an N-aqueous solution of sodium hydroxide, the solution was demineralized with 25 parts by weight of activated charcoal. The eluate was concentrated and the condensate was adjusted to pH 8 with an N-aqueous ammonia.

(Analysis of so-treated solution by means of paper electrophoresis (borate buffer, pH 9.2) showed that cytosine arabinoside-5′-monophosphate was produced in a yield of 85%).

Thus-treated solution was passed through a column packed with 35 parts by volume of anion exchange resin (e.g. Dowex–1X8 HCOOH type, 100–200 mesh).

The column was washed with water and eluted with 2,700 parts by volume of 0.016 N—HCOOH.

After concentration, the eluate was demineralized with 40 parts by weight of activated charcoal, followed by addition of ethanol and barium acetate, whereby 1.34 parts by weight of barium salt of cytosinearabinoside-5′-monophosphate was given as colorless powder. Yield 75%.

*Elementary analysis.*—Calculated for $C_9H_{12}O_8N_3PBa \cdot 1\frac{1}{2} H_2O$: N, 8.66%; P, 6.39%. Found: N, 8.29%; P, 6.45%.

The product is completely dephosphorylated by bull semen 5′-nucleotidase, and consumes one mole of periodic acid at 5–10° C. in 73 hours Ultraviolet absorption $\lambda_{max.}^{0.1 N-HCl}$ 281 m$\mu$($\epsilon$=11.8×10³)$\lambda_{min}$240 m$\mu$ $\lambda_{max.}^{H_2O}$ 274.5 m$\mu$($\epsilon$=8.3×10³)$\lambda_{min}$250 m$\mu$ $\lambda_{max.}^{0.1 N-NaOH}$ 273 m$\mu$($\epsilon$=8.4×10³)$\lambda_{min}$250 m$\mu$ When methyl acylate or nitrobenzene was used in place of m-cresol, substantially the same result was obtained.

EXAMPLE 2

To 1 part by weight of 9-β-D-glucopyranosyladenine suspended in 150 parts by volume of m-cresol was added 5 parts by volume of pyrophosphoryl tetrachloride at 0 to 5° C.

After the reaction mixture was kept standing under the same temperature for 3 hours to allow a reaction to take place, it was subsequently treated in the same way as in Example 1.

(An analysis of so-treated solution by means of paper electrophoresis (citrate buffer, pH 5.8) showed that adenine glucoside-6′-monophosphate was produced in a yield of 85%.)

Thus-treated solution was passed through a column packed with 20 parts by volume of anion exchange resin (Dowex–1X8, HCOOH type, 100–200 mesh).

After the column was washed with water and eluted with 3600 parts by volume of 0.1 N—HCOOH, it was subsequently treated in the same way as in Example 1 to give 1.34 parts by weight of barium salt of adenine glucoside-6′-monophosphate (calculated as anhydride) as colorless powder. Yield 78%.

*Elementary analysis.*—Calculated for $C_{11}H_{14}O_8N_5PBa \cdot 2\frac{1}{2}H_2O$. Calculated: N, 12.56%; P, 5.55%. Found: N, 12.14%; P, 5.56%. $[\alpha]_D^{22}=-13.2°$ (c.=0.5%, $H_2O$).

EXAMPLE 3

To 2.6 parts by weight of 2'-O-methyluridine dissolved in 100 parts by volume of m-cresol was added 3.5 parts by volume of pyrophosphoryl tetrachloride at 0 to 5° C.

The mixture was stirred under the same temperature for one hour. The reaction mixture was poured into 1000 parts by volume of ether and the whole mixture was extracted twice with 200 parts by volume of water.

After the aqueous layer was separated and neutralized with an N-aqueous solution of sodium hydroxide, the solution was passed through a column packed with 500 parts by volume of anion exchange resin (Dowex–1X8, HCOOH type).

The column was washed with water and eluted with 3000 parts by volume of 0.5 N—HCOOH.

The eluate was demineralized with 200 parts by weight of activated charcoal. Thus treated eluate was condensed and 2000 parts by weight of acetone added to give 2.8 parts by weight of ammonium salt of 2'-O-methyluridine-5'-monophosphate (calculated as anhydride) as white powder. Yield 80%.

Specific rotation: $[\alpha]_D^{20} = 15.7°$ (c.=1.5%, $H_2O$).

Analysis of thus-obtained product by means of paper chromatography (N-butyric acid:N/2 $NH_4OH$=10:6 and isopropanol:ammonium sulfate:0.1 M phosphate buffer pH 6.8=2:60:100), gave the $R_f$ value identical with that of the naturally occurring 2'-O-methyluridine-5'-monophosphate.

EXAMPLE 4

To 2.95 parts by weight of 2'-O-methylcytidine suspended in 100 parts by volume of m-cresol was added 3.5 parts by volume of pyrophosphoryl tetrachloride at 0 to 5° C.

The mixture was stirred under the same temperature for 4 hours. The reaction mixture was poured into 1000 parts by volume of ether and the whole mixture was extracted twice with 200 parts by volume of water.

After the aqueous layer was separated and neutralized with an N-aqueous solution of sodium hydroxide, the solution was passed through a column packed with 500 parts by volume of anion exchange resin (Dowex–1X8, HCOOH type).

The column was washed with water and eluted with 3000 parts by volume of 0.1 N—HCOOH.

After the eluate was subjected to evaporation under reduced pressure, the residue was dissolved in 50 parts by volume of water followed by addition of 50 parts by volume of ethanol to give 2.8 parts by weight of 2'-O-methylcytidine-5'-monophosphate (calculated as anhydride) as white powder. Yield 60%.

When the above obtained product was analyzed by means of paper chromatography (N-butyric acid:N/2 $NH_4OH$=10:6 and isopropanol:ammonium sulfate:0.1 M phosphate buffer pH 6.8=2:60:100), the $R_f$ value was identical with that of the naturally occurring 2'-O-methylcytidine-monophosphate.

$[\alpha]_D^{20} = 42.9°$ (c.=2.2%, $H_2O$)

EXAMPLE 5

To 3.6 parts by weight of 9-β-D-xylofuranosyladenine suspended in 200 parts by volume of acetonitrile was added 5 parts by volume of pyrophosphoryl tetrachloride at 0 to 5° C.

The mixture was stirred under the same temperature for 2 hours. The reaction mixture was treated in the same manner as in Example 2 to give 3.4 parts by weight of crystals of disodium salt of 9-β-D-xylofuranosyladenine-5'-monophosphate (calculated as anhydride). Yield 65%.

When the above obtained product was analyzed by means of paper electrophoresis (borate buffer, pH 9.2), a difference between the migration distance of 5'-adenylic acid and that of the product was 0.77 and the product was completely dephosphorylated by bull semen 5'-nucleotidase.

EXAMPLE 6

To 0.75 part by weight of 2'-deoxyadenosine suspended in 30 parts by volume of m-cresol was added 1 part by volume of pyrophosphoryl tetrachloride at 0 to 5° C.

The mixture was stirred under the same temperature for 2 hours. The reaction mixture was treated in the same manner as in Example 1.

Analysis of so-treated product by means of paper electrophoresis (borate buffer, pH 9.2) showed that 2'-deoxyadenosine-5'-monophosphate was produced in a yield of 70%.

EXAMPLE 7

To 0.264 part by weight of 2'-deoxycytidine suspended in 15 parts by volume of m-cresol was added 1 part by volume of pyrophosphoryltetrachloride at 0 to 5° C.

After the mixture was stirred under the same temperature for 2 hours to allow a reaction to take place, it was subsequently treated in the same way as in Example 1.

Thus-treated solution was passed through a column packed with 5 parts by volume of an ion exchange resin (Dowex–1X8, Cl type, 100–200 mesh). Then the column was washed with water and eluted with 450 parts by volume of 0.002 N-HCl. The eluate was demineralized with 2 parts by weight of activated charcoal, followed by condensation, and barium acetate and ethanol were added to thus-treated eluate to give 0.33 part by weight of barium salt of 2'-deoxycytidine-5'-monophosphate (calculated as anhydride) as colorless powder. Yield 75%.

EXAMPLE 8

To 0.684 part by weight of 2'-deoxyuridine suspended in 30 parts by volume of m-cresol was added 1 part by volume of pyrophosphoryl tetrachloride at 0 to 5° C.

The mixture was stirred under the same temperature for 2 hours.

The reaction mixture was treated after the manner of Example 1.

Thus-treated solution was condensed, followed by passing through a column packed with 10 parts by volume of an ion exchange resin (Dowex–1X8, Cl type, 100–200 mesh). Then the column was washed with water and eluted with 1100 parts by volume of 0.1 N-formic acid and 0.1 M-ammonium formate.

The eluate was demineralized with 3 parts by weight of activated charcoal, and admixed with barium acetate and ethanol to give 0.995 part by weight of barium salt of 2'-deoxyuridine-5'-monophosphate (calculated as anhydride). Yield 75%.

EXAMPLE 9

To 2.9 parts by weight of thymidine suspended in 150 parts by volume of m-cresol was added 5 parts by volume of pyrophosphoryl tetrachloride at a temperature of 0 to 5° C.

The mixture was stirred under the same temperature for 2 hours.

The reaction mixture was poured into 500 parts by volume of ice water and the whole mixture was subjected to extraction with 150 parts by volume of ether to transfer the m-cresol into the ether layer.

After the aqueous layer was separated and adjusted to pH 2 with an N-aqueous solution of sodium hydroxide, the solution was demineralized with 25 parts by weight of activated charcoal. The eluate was concentrated and the condensate was adjusted to pH 8 with an N-aqueous ammonia.

Thus-treated solution was passed through a column packed with 30 parts by volume of anion exchange resin (Dowex–1X8, HCOOH type, 100–200 mesh).

The column was washed with water and eluted with 4900 parts by volume of 0.01 N-formic acid and 0.1 M ammonium formate.

The eluate was demineralized with 40 parts by weight of activated charcoal, followed by addition of barium acetate and ethanol, whereby 4.12 parts by weight of barium salt of thymidine-5'-monophosphate (calculated as anhydride) was given as colorless powder. Yield 75%.

Having thus disclosed the invention, what is claimed is:

1. A method for the production of nucleotide which comprises reacting the nucleoside selected from the group consisting of 1-β-D-arabinofuranosylcytosine, 9-β-D-glucopyranosyladenine, 2'-O-methyluridine, 2'-O-methylcytidine, 9-β-D-xylofuranosyladenine, 2'-deoxycytidine, 2'-deoxyadenosine, 2'-deoxyuridine and thymidine with phosphorylating agent in the presence of a member selected from the group consisting of phenols, nitriles, the esters of organic carboxylic acids having from 2 to 7 carbon atoms and nitrohydrocarbons having 1–7 carbon atoms and subjecting the resultant compound to hydrolysis.

2. In a method for the production of nucleotide from the corresponding nucleoside the improvement wherein the nucleoside selected from the group consisting of 9-β-D-arabinofuranosylcytosine, 9-β-D-glucopyranosyladenine 2'-O-methyluridine, 2' - O - methylcytidine, 9-β-D-xylofuranosyladenine, 2'-deoxycytidine, 2'-deoxyadenosine, 2'-deoxyuridine and thymidine is reacted with phosphorylating agent in the presence of a member selected from the group consisting of phenols, nitriles, the esters of organic carboxylic acids having from 2 to 7 carbon atoms and nitro-hydrocarbons having 1 to 7 carbon atoms.

3. A method as claimed in claim 1, wherein the nucleoside is 9-β-D-xylofuranosyladenine.

4. A method as claimed in claim 1, wherein the reaction is carried out in the presence of acetonitrile.

5. A method as claimed in claim 1, wherein the reaction is carried out in the presence of m-cresol.

6. A method as claimed in claim 1, wherein the phosphorylating agent is pyrophosphoryl tetrachloride.

7. A method as claimed in claim 1, wherein the molar proportion of said member to nucleoside is about 40 to about 300.

References Cited
UNITED STATES PATENTS

| | | | |
|---|---|---|---|
| 3,201,388 | 8/1965 | Tsuchiya et al. | 260—211.5 |
| 3,201,389 | 8/1965 | Fujimoto et al. | 260—211.5 |
| 3,290,285 | 12/1966 | Senoo et al. | 260—211.5 |
| 3,300,478 | 1/1967 | Wechter | 260—211.5 |
| 3,382,232 | 5/1968 | Honjo et al. | 260—211.5 |

LEWIS GOTTS, *Primary Examiner.*

J. R. BROWN, *Assistant Examiner.*